United States Patent
Kanaya et al.

(10) Patent No.: US 8,274,761 B2
(45) Date of Patent: Sep. 25, 2012

(54) MAGNETIC HEAD INCLUDING A THERMAL ASPERITY EFFECT ELEMENT SENSOR IN A STEPPED-BACK POSITION FROM AN AIR BEARING SURFACE

(75) Inventors: Takayasu Kanaya, Tokyo (JP); Yosuke Antoku, Tokyo (JP); Kazuki Sato, Tokyo (JP); Takayuki Nishizawa, Tokyo (JP); Masaru Iida, Tokyo (JP)

(73) Assignee: TDK Corporation, Tokyo (JP)

( * ) Notice: Subject to any disclaimer, the term of this patent is extended or adjusted under 35 U.S.C. 154(b) by 178 days.

(21) Appl. No.: 12/718,404

(22) Filed: Mar. 5, 2010

(65) Prior Publication Data

US 2011/0216430 A1 Sep. 8, 2011

(51) Int. Cl.
*G11B 5/39* (2006.01)
*G11B 27/36* (2006.01)

(52) U.S. Cl. ............ 360/322; 360/31; 360/75; 360/320

(58) Field of Classification Search .................. 360/320, 360/321, 322, 313, 31, 75
See application file for complete search history.

(56) References Cited

U.S. PATENT DOCUMENTS

| | | | |
|---|---|---|---|
| 5,909,344 A * | 6/1999 | Gill | 360/321 |
| 5,991,125 A * | 11/1999 | Iwasaki et al. | 360/324.12 |
| 6,223,420 B1 * | 5/2001 | Lee et al. | 360/321 |
| 7,589,928 B2 | 9/2009 | Roy et al. | |
| 2002/0048126 A1 * | 4/2002 | Shimazawa | 360/320 |
| 2002/0154452 A1 * | 10/2002 | Gill | 360/321 |
| 2002/0181166 A1 * | 12/2002 | Gill | 360/321 |
| 2002/0186515 A1 * | 12/2002 | Gill | 360/324.2 |
| 2003/0137781 A1 * | 7/2003 | Carey et al. | 360/321 |
| 2008/0007871 A1 | 1/2008 | Kiyono et al. | |
| 2008/0043355 A1 | 2/2008 | Ota | |
| 2008/0094755 A1 | 4/2008 | Ota et al. | |

FOREIGN PATENT DOCUMENTS

| | | |
|---|---|---|
| JP | A-H08-167121 | 6/1996 |
| JP | B2-2953417 | 7/1999 |
| JP | B2-2980074 | 9/1999 |
| JP | A-2004-164797 | 6/2004 |

OTHER PUBLICATIONS

C. Dennis Mee and Eric D. Daniel, *Magnetic Recording Technology Second Edition*, pp. 1.12-1.14, Mar. 1996.

* cited by examiner

*Primary Examiner* — Craig A. Renner
(74) *Attorney, Agent, or Firm* — Posz Law Group, PLC (57) ABSTRACT

A magnetic head disposed in a slider arranged with an interval with respect to a magnetic disk includes a sensor that is positioned in a stepped-back position from an air bearing surface facing the magnetic disk, an insulating film that is positioned on the air bearing surface and that covers the sensor; a pair of lead films, the lead films being electrically connected to the sensor such that at least portions of the lead films are exposed on the air bearing surface, and being configured to transfer a temperature change of the air bearing surface to the sensor.

6 Claims, 11 Drawing Sheets

MAGNETIC HEAD INCLUDING A THERMAL ASPERITY EFFECT ELEMENT SENSOR IN A STEPPED-BACK POSITION FROM AN AIR BEARING SURFACE

BACKGROUND OF THE INVENTION

1. Field of the Invention

The present invention relates to a magnetic head that incorporates a sensor for measuring a flying height of the magnetic head and for detecting the presence or absence of a projection on a surface of a magnetic disk, and that is used for writing information on the magnetic disk and/or reading information from the magnetic disk.

2. Description of the Related Art

A magnetic head, such as a hard disk device, is arranged at an interval apart from a surface of a rotating magnetic disk, and functions to write information on the magnetic disk and/or to read information from the magnetic disk. In recent years, in association with high density recording on the magnetic disk, the interval between the magnetic head and the surface of the magnetic disk (a flying height of the magnetic head) has become extremely small. The interval is set at, for example, 10 nm or less. In such a case where the flying height of the magnetic head is very minute, when the flying height of the magnetic head is fluctuated for some reason or there is an unintentional projection on the surface of the magnetic disk, the magnetic head may contact the surface of the magnetic disk, thereby damaging the magnetic head. Therefore, in order to control the magnetic head so as not to contact the magnetic disk, it is desirable to control the flying height of the magnetic head and to preliminarily detect the presence or absence of the projection on the surface of the magnetic disk.

In Japanese Patent Laid-Open Publication No. 2004-164797, a projection detection head having a sensor for detecting a projection formed on a surface of a magnetic disk is disclosed. This sensor is arranged on an air bearing surface of a slider including the projection detection head, and detects a resistance change corresponding to frictional heat generated by contact between the projection detection head and the magnetic disk. Since this configuration is configured with not only the magnetic head but also the projection detection head, the configuration is extremely complex or two devices (a magnetic disk device and the projection detection device) are needed. Therefore, this results in a complex configuration and an increase in cost.

In Japanese Patent Laid-Open Publication No. 1-18-167121, Japanese Patent No. 2953417, and Japanese Patent No. 2980074, another configuration is disclosed. In the configuration, a MR (magneto-resistance) element that actually works as a reproducing element of a magnetic disk device is used as a sensor for detecting a resistance change corresponding to frictional heat generated by contact between a magnetic head and a magnetic disk. In Japanese Patent No. 2953417 and Japanese Patent No. 2980074 among the documents, the MR element is positioned in a stepped-back position from an air bearing surface that is opposite to the magnetic disk, and is connected to a heat conductive film exposed to the air bearing surface.

In the prior art, the presence or absence of the unintentionally formed projection (abnormal projection) on the surface of the magnetic disk is detected, and the sensor does not exercise a special functional effect when a normal magnetic disk is used on which an unintentional projection is not present.

For a sensor for detecting the resistance change corresponding to the frictional heat generated by contact between the magnetic head and the magnetic disk, when such a sensor is away from a portion of the magnetic head which directly contacts the magnetic disk, it is sometimes impossible to detect the contact. However, it is necessary for the reproducing element of the magnetic disk device to be positioned in a suitable position for reproducing information. Accordingly, the reproducing element may not necessarily be positioned at a suitable position as the sensor for detecting the contact. A TMR (tunnel magneto-resistance) element that has been the mainstream of a reproducing element in recent years is not appropriate when the flying height of the magnetic head is small as described above. That is because a change of an electrical resistance value of a barrier layer caused by a change in heat is small so that detection sensitivity is not excellent.

In U.S. Pat. No. 7,589,928, a device is disclosed for measuring a flying height of a magnetic head from the magnetic disk, i.e., an interval between the magnetic head and the surface of the magnetic disk regardless of presence of a projection on a surface of a magnetic disk. In this device, a configuration with a sensor is disclosed in addition to a recording element and a reproducing element of the magnetic head. The sensor is disposed for detecting a temperature change corresponding to a change of the flying height of the magnetic head from the magnetic disk.

In the former of the above-described prior art for detecting the projection on the surface of the magnetic disk, the frictional heat generated by actual contact between the projection detection head or the magnetic head and the magnetic disk is used. Also in the latter of the above-described prior art for measuring the flying height of the magnetic head from the magnetic disk in order to obtain the flying height of the magnetic head under a certain state, an output of the sensor under the certain state and an output of the sensor under a contacting state where the magnetic head is intentionally contacted to the surface of the magnetic head are compared. In other words, by comparing the state where the flying height is to be measured with the other state where the flying height of the magnetic head is zero, the flying height to be measured is obtained. Accordingly, in all of the above-described prior art, the magnetic heads have to be contacted to the magnetic disk.

If the sensor itself directly contacts the magnetic disk when the magnetic head is contacted to the magnetic disk as described above, the sensor might possibly be damaged so that physical reliability is impaired and/or corrosion resistance is deteriorated. The sensor is exposed on the air bearing surface which must be formed with high accuracy in order to increase the accuracy of recording and reproducing while maintaining the magnetic head in the desired orientation and position. If the sensor is largely jutted or stepped-back from the air bearing surface, it is difficult to maintain the air bearing surface in the desired shape so that performance of the magnetic head may be deteriorated. Accordingly, the sensor must be of a size and a shape that does not affect the size and shape of the air bearing surface, and there is a restriction to choose material as well.

SUMMARY OF THE INVENTION

An object of the present invention is to provide a magnetic head incorporating a sensor, wherein physical reliability and corrosion resistance of the sensor are not impaired by an effect caused by contact between the magnetic head and a magnetic disk, and the size and the shape of an air bearing surface is not affected.

A magnetic head of the present invention disposed in a slider arranged with an interval with respect to a magnetic disk includes a sensor that is positioned in a stepped-back position from an air bearing surface facing the magnetic disk, an insulating film that is positioned on the air bearing surface and that covers the sensor; a pair of lead films, the lead films being electrically connected to the sensor such that at least portions of the lead films are exposed on the air bearing surface, and being configured to transfer a temperature change of the air bearing surface to the sensor.

The magnetic head further includes a heater that is provided in the slider and that decreases a flying height of the magnetic head from the magnetic disk due to a heat expansion of the slider.

An electrical resistance value of the sensor varies correspondingto a temperature change of the air bearing surface as transferred through the lead films, and the pair of the lead films respectively connect both edge parts of the sensor and apply a voltage to the sensor.

The stepped-back distance of the sensor from the air bearing surface is preferably 10 nm or more, further is preferably 200 nm or less.

The lead film includes at least a material having a heat conductivity ratio of 70 W/(m·k) or more.

The above and other objects, features and advantages of the present invention will become apparent from the following description with reference to the accompanying drawings which illustrate examples of the present invention.

DESCRIPTION OF THE PREFERRED EMBODIMENTS

Hereafter, embodiments of the present invention will be explained with reference to the drawings.

Figure 1A:
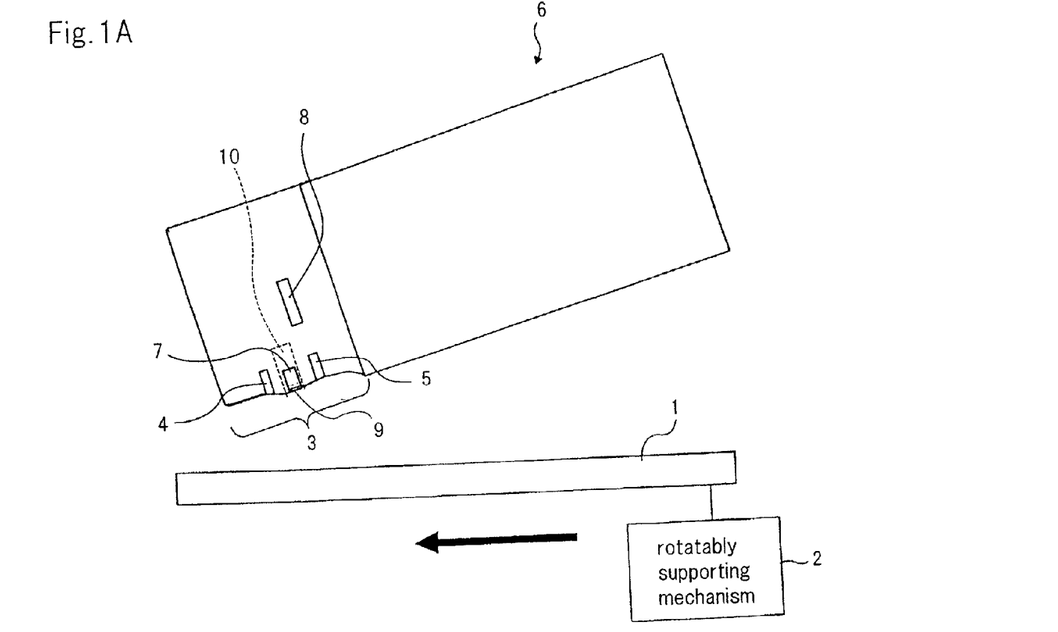
FIG. 1A is a schematic view of a main part of a hard disk device in one embodiment of the present invention illustrating a heater in a non-driven state.
Figure 1B:
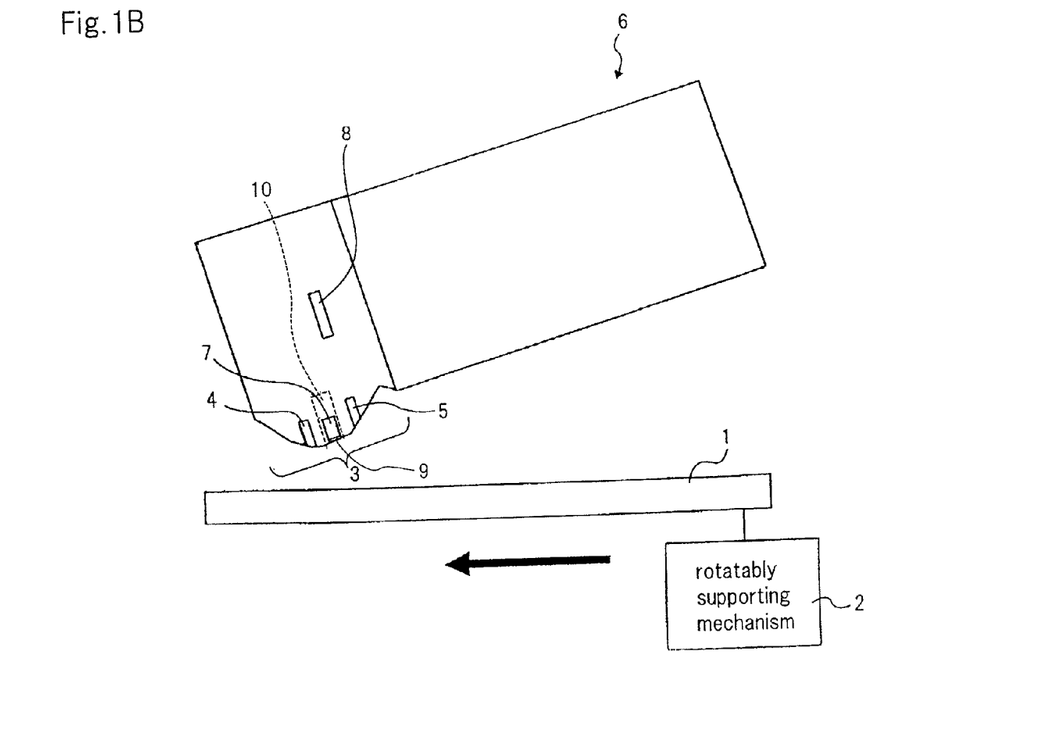
FIG. 1B is a schematic view of the main part of the hard disk device in one embodiment of the present invention illustrating a heater in a driven state.

FIGS. 1A and 1B are schematic views illustrating a main part of a hard disk device that is one example of a device to which the present invention is applied. The hard disk device provides for a rotatably supporting mechanism 2 that rotatably supports a magnetic disk (hard disk) 1 and a slider 6 that is positioned in a position opposite to the rotatably supporting mechanism 2. A magnetic head 3 is formed at a tip part of the slider 6. The magnetic head 3 has a recording element part (a writing part) 4, a reproducing element part (a reading part) 5, a sensor 7 and a heater 8. Magnetic information can be written by the recording element part 4 of the magnetic head 3 on the magnetic disk 1 that is rotated and supported by the rotatably supporting mechanism 2. The reproducing element part 5 of the magnetic head 3 can read magnetic information recorded on the magnetic disk 1.

The sensor 7 of the magnetic head 3 is arranged in a separated manner from the reproducing element part 5. The sensor 7 can measure an electrical resistance value of an inside in the same way as a thermal asperity effect element sensor disclosed in U.S. Patent Application Publication No. 2008/007871, and is used to detect contact between the magnetic head 3 and a surface of the magnetic disk 1. The sensor 7 is not exposed on the air bearing surface S and is positioned in a stepped-back position from the air bearing surface S. In the present embodiment, the sensor 7 is positioned such that the sensor 7 is stepped back by a distance in a range from 10 nm through 200 nm from the air bearing surface S. The sensor 7 is made of a metal such as NiFe, Ni, Ti, W, Pt, Ta, Ru or Au, or an alloy or a lamination film including one or more types of these metals. A surface of the air bearing surface S side of the sensor 7 is covered by an insulating film 9 made of, for example, alumina. The parts of the air bearing surface S other than the part of a lead film 10, which will be described later, are an insulating film 16 made of an insulating material such as alumina in the same manner as the insulating film 9. The surface of the insulating film 9 is positioned in the same plane as the surface of the other parts of the air bearing surface S. Therefore, except parts that are intentionally formed an asperity, the air bearing surface S can be formed as an entirely planar surface. This contributes to realize a desired flying posture and a flying height of the slider 6.

Although it is not described in detail, a circuit that applies voltage to the sensor 7 is configured to measure the electrical resistance value of the sensor 7. The lead film 10 composing a portion of the circuit contacts and electrically connects the sensor 7. At least a portion of the lead film 10 is exposed on the air bearing surface S. The lead film 10 also functions as a heat conductive film. The lead film 10 is made of a material having a heat conductive ratio of 70 W/(m·k) or more. For example, the material is a metal such as Ag, Al, Au, Co, Cu, In, Ir, Mo, Ni, Os, Rh, Ru, W, Zn or Pt, or an alloy or a lamination film that includes one or more types of these metals. Since a material having a high resistivity tends to have a low heat conductive ratio, a balance between a low resistance value and a high heat conductivity is achieved by thickening the lead film 10. In the present embodiment, a pair of the lead films 10 is arranged in a manner of contacting both end parts of a track direction of the sensor 7 (a direction orthogonal to a lamination direction of each layer of the magnetic head 3), but not limited to this arrangement. However, if it is configured such that a pair of the lead films extending parallel to the air bearing surface S sandwiches the sensor 7, the resistance value is small so that a resistance value change is not detected with high sensitivity. Therefore, such a configuration is not preferred.

As well as heaters disclosed in U.S. Patent Application Publication No. 2008/0043355, U.S. Patent Application Publication No. 2008/94755, and U.S. Patent Application Publication No. 2008/007871, the heater 8 of the magnetic head 3 can make at least a part of the slider 6 thermally expanded by heat generation so that the magnetic head 3 approaches the magnetic disk 1. FIG. 1A illustrates a positional relation between the slider 6, in a state where the heater 8 is non-driven, and the magnetic disk 1. FIG. 1B illustrates a positional relation between the slider 6, in a state where the heater 8 is driven and closed to the magnetic disk 1, and the magnetic disk 1. Details of a configuration of a head gimbal assembly 220 including the magnetic head 3 and the slider 6 will be described later.

In the present embodiment, in order to obtain the flying height of the magnetic head 3, i.e., an interval between the magnetic head 3 and the surface of the magnetic disk 1 supported by the rotatably supporting mechanism 2, the magnetic head 3 is contacted to the magnetic disk 1. For example, an output of the sensor 7 under a condition where the flying height must be measured and another output of the sensor 7 under a condition where the flying height is zero, i.e., a condition where the magnetic head 3 is contacted to the magnetic disk 1, are measured respectively. Then, the flying height of the magnetic head 3 is obtained based on the measured results using, for example, the known Wallace equation (see C. Dennis Mee, Eric D. Daniel "Magnetic Recording Technology Second Edition" pp. 1.12-1.14, March 1996).

The output of the sensor 7 to be measured for such flying height measurement corresponds to the electrical resistance value of the sensor 7. Specifically, a voltage is applied to the sensor 7 through the lead film 10, and a current at the same time is detected. In order to measure the output corresponding to the electrical resistance value of the sensor 7, the lead film 10 or an electrically conductive member that is an alternative of the lead film 10 is essential.

In the present embodiment, at least a part of the lead film 10 is exposed on the air bearing surface S. As described above, since the lead film 10 has high heat conductivity, a temperature change of the air bearing surface S, i.e., frictional heat corresponding to the contact between the magnetic head 3 and the magnetic disk 1, is detected with high sensitivity and is efficiently transferred to the sensor 7. The electrical resistance value of the sensor 7 is changed by the heat of the air bearing surface S that is transferred through the lead film 10. This is because metals have a property that an electrical resistance value R increases corresponding to an increase of the temperature.

As described above, an electrically conductive path is configured in a manner of sandwiching the sensor 7 between the lead films 10. The electrically conductive path also functions as a heat transmitting path. On the other hand, in the other part except the sensor 7, an insulating material such as alumina is disposed between the lead films 10, for example, the insulating film 9 is arranged between the lead films 10 on the air bearing surface S, so that the electrically conductive path is not configured. This also means that there is no other electrically conductive path that is connected in a parallel manner with respect to the electrically conductive path configured by the lead films 10 and the sensor 7.

In a case where an electrically conductive path that is connected in a parallel manner is present, the output cannot be accurately measured, even if the output of the sensor 7 is intended to be measured by applying a predefined voltage to the lead films 10. For example, in the configuration disclosed in Japanese Patent No. 2,953,417, two electrically conductive paths are arranged in parallel. One of the electrically conductive paths is configured by a heat conductive film made of, for example, gold and a sensor (an MR element in this example). The other is configured for supplying electrical power necessary to measure an output of the sensor (although not shown) or to have the sensor function as the MR element. In such case, since current in parallel occurs, the resistance change of the sensor becomes small. Accordingly, sensitivity and efficiency of detecting an output that accurately corresponds to the resistance change is deteriorated. On the other hand, in the configuration of the present embodiment, there is no other electrically conductive path that is connected in parallel to the electrically conductive path configured with the lead films 10 and the sensor 7 so that the output that corresponds to the resistance change of the sensor 7 can be measured with high sensitivity and high efficiency.

A significance of detecting the temperature change of the air bearing surface S using the sensor 7 as described above will be explained.

Initially, the sensor 7 detects a contact of the magnetic head 3 against the magnetic disk 1. In other words, when the slider 6 moves downwardly so much that the magnetic head 3 contacts the magnetic disk 1, friction occurs in the contacting part of the air bearing surface S of the magnetic head 3 and the surface of the magnetic disk 1, and the frictional heat causes a drastic temperature increase. The drastically increased temperature is transferred to the sensor 7 through the lead films 10 having the high heat conductivity, and the electrical resistance is also increased corresponding to the temperature increase of the sensor 7. This is based on a common property that the electrical resistance of metals increases as their temperatures increase. The increase of the electrical resistance value of the sensor 7 is detected by a circuit (not shown) connected to the lead films 10. Accordingly, the contact of the magnetic head 3 to the magnetic disk 1 can be detected. In the case where the flying height of the magnetic head 3 is requested, two electrical signals are used. One is an electrical signal under a condition where the flying height is measured (such as the output of the sensor 7 or a reproducing signal of a predetermined record from the reproducing element part 5), and the other is an electrical signal under a condition where the magnetic head 3 contacts the magnetic disk 1 (namely, the flying height is zero). In this case, by the present invention, the resistance change of the sensor 7 is accurately detected so that the contact of the magnetic disk 1 to the magnetic head 3 is accurately detected.

Further, in the present invention, by controlling a heat expansion amount of the slider 6, in which the magnetic head 3 is disposed, by driving the heater 8 which is disposed in the magnetic head 3, the flying height of the magnetic head 3, i.e., the interval between the magnetic head 3 and the magnetic disk 1, can be controlled. Specifically, when the heat expansion amount of the slider 6 caused by a heat application of the heater 8 is large, the magnetic head 3 positioned at a tip of the slider 6 approaches the magnetic disk 1 (the flying height becomes small). When the heat expansion amount of the slider 6 is small, the magnetic head 3 at the tip of the slider 6 does not approach the magnetic disk 1 very much (the flying height becomes large). During the heat application of the heater 8, the temperature of the sensor 7 also increases, and the electrical resistance value of the sensor 7 increases corresponding to the temperature increase caused by the heat application of the heater 8. Namely, in accordance with the heat application of the heater 8, the electrical resistance value of the sensor 7 increases while the flying height of the magnetic head 3 decreases. Where the relation between the flying height of the magnetic head 3 and the electrical resistance value of the sensor 7 are obtained in advance, the flying height of the magnetic head 3 can be calculated by accurately obtaining the resistance change of the sensor 7 according to the present invention.

Hereafter, an embodiment of a magnetic head 3 of the present invention will be explained in detail with reference to FIGS. 2 and 3.

The magnetic head 3 of the present embodiment has a recording element part (writing part) 4 and a reproducing element part (reading part) 5. The reproducing element part 5 has a MR (magneto-resistance) element 12 and first and second shield layers 13 and 14 that are arranged in a manner of sandwiching the MR element 12 in a film surface orthogonal direction P of the MR element 12. The MR element 12 may be either a GMR (giant magneto-resistance) element or a TMR element. The first shield layers 13 and the second shield layers 14 function as an electrode through which a sense current flows in the film surface orthogonal direction P of the MR element 12 as well.

An interelement shield layer 26 is arranged above the second shield layer 14. The recording element part 4 is arranged above the interelement shield film 26. The recording element part 4 has a structure for, so-called perpendicular magnetic recording. A magnetic pole layer for writing is composed by a main magnetic pole layer (lower yoke) 21 and an auxiliary magnetic pole layer (upper yoke) 22. The main magnetic pole layer 21 is made of FeCo and is exposed in a direction nearly orthogonal to the air bearing surface S on the air bearing surface S that is opposite to the magnetic disk 1 of a recording medium. In the periphery of the main magnetic pole layer 21, a coil layer 23 is wounded around, which extends over a gap layer 24 that is made of an insulating material, and the coil layers 23 induce a magnetic flux into the main magnetic pole layer 21. This magnetic flux is induced in the main magnetic pole layer 21 and is emitted to the magnetic disk 1 of the recording medium (see FIGS. 1A and 1B) from the air bearing surface S.

The insulating film 16 made of an insulating material, such as alumina, is arranged between each of the shield layers, each of the elements or the like. In the insulating film 16, the pre-described sensor 7 and the pair of lead films 10 positioned at both end parts of the sensor 7 in the track direction are arranged. The insulating films 9 and 16 are preferably made of the same insulating material such as alumina, and actually they are not distinguishable in most cases because they are formed in an integrated manner. However, in the present specification, in order to clarify a functional effect of the insulating film 9 covering a surface of the sensor 7, the insulating films 9 and 16 are often described as different parts for ease of understanding.

The auxiliary magnetic pole layer 22 is a magnetic layer that is magnetically coupled to the main magnetic pole layer 21. The auxiliary magnetic pole layer 22 is a magnetic pole layer that is made of, for example, an alloy made of two or three of Ni, Fe or Co. The auxiliary magnetic pole layer 22 is arranged in a manner of branching from the main magnetic pole layer 21. The auxiliary magnetic pole layer 22 is opposite to the main magnetic pole layer 21 through the gap layer 24 and a coil insulating layer 25 in the air bearing surface S side.

Figure 3:
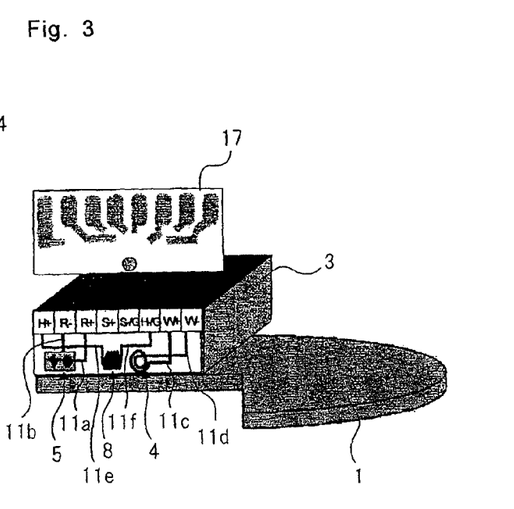
FIG. 3 is a schematic view illustrating electrical connections of the magnetic head illustrated in FIG. 2.

In FIG. 3, electrical wiring in the magnetic head 3 is schematically illustrated. As illustrated in FIG. 3, the magnetic head 3 has a pair of electrical connection parts 11a and 11b that connect to the reproducing element part 5, a pair of electrical connection parts 11e and 11d that connect to the recording element part 4, and a pair of electrical connection parts 11e and 11f that connect to the heater 8. Moreover, although not illustrated in FIG. 3, as described above, the lead films 10 are electrical connection parts, that are electrically connected to the sensor 7 and exposed on the air bearing surface S. Additionally, FIG. 3 schematically discloses the structure that is extracted from the magnetic head 3, which is a connection substrate 17 arranged in the magnetic head 3. The connection substrate 17 is a connection part connecting the electrical connection parts 11a through 11f and the lead film 10 to an external circuit (not shown).

Hereafter, in order to understand the characteristics of the magnetic head 3 of the present embodiment, an experiment performed by the present applicant will be explained.

Figure 4A:
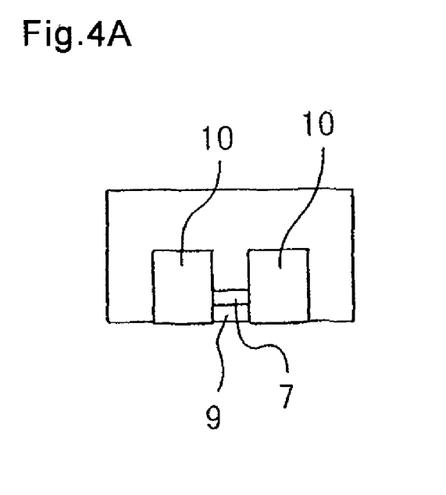
FIG. 4A is a view of the magnetic head of embodiments of the present invention seen from an integration surface side.
Figure 4B:
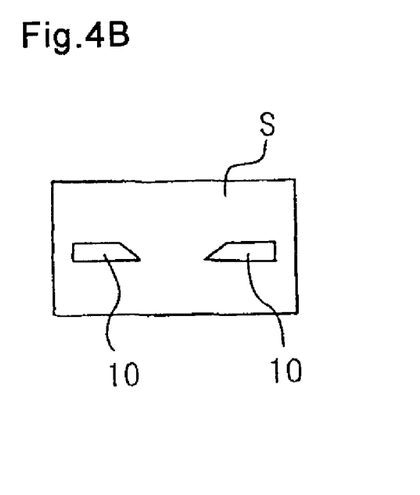
FIG. 4B is a view illustrating an air bearing surface of the magnetic head of the embodiments of the present invention.

Initially, three types of a magnetic head 3 of the embodiment of the present invention were manufactured (see FIGS. 4A and 4B). In one magnetic head 3 (an embodiment 1), a surface of a sensor 7 was positioned at a stepped-back position of 100 nm from an air bearing surface S and was covered by an insulating film 9 made of alumina. In another magnetic head 3 (an embodiment 2), a surface of a sensor 7 was positioned at a stepped-back position of 150 nm from an air bearing surface S and covered by an insulating film 9 made of alumina. In the other magnetic head 3 (an embodiment 3), a surface of a sensor 7 was positioned in a stepped-back position of 250 nm from an air bearing surface S and covered by an insulating film 9 made of alumina. In each of the magnetic heads 3, lead films 10 were exposed on the air bearing surfaces S.

Figure 5A:
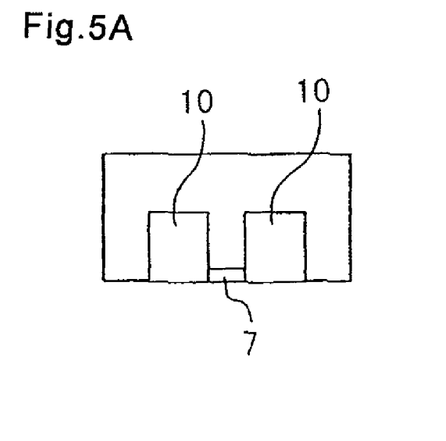
FIG. 5A is a view of the magnetic head of a comparative example 1 seen from the integration surface side.
Figure 5B:
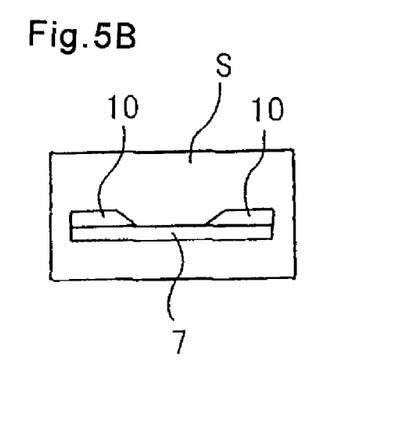
FIG. 5B is a view illustrating the air bearing surface of the magnetic head of the comparative example 1.
Figure 6A:
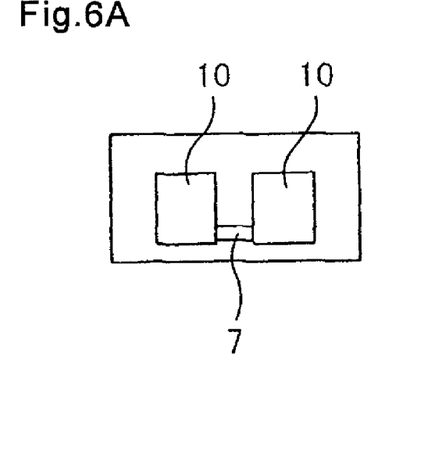
FIG. 6A is a view illustrating the magnetic head of a comparative example 2 seen from the integration surface side.
Figure 6B:
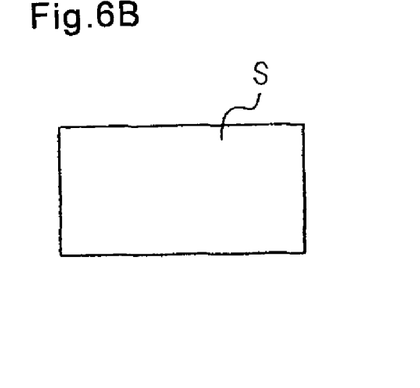
FIG. 6B is a view of the air bearing surface of the magnetic head of the comparative example 2.

Next, as a comparative example 1, a magnetic head (see FIGS. 5A and 5B) in which both a sensor 7 and lead films 10 were exposed on an air bearing surface S was manufactured. As a comparative example 2, a magnetic head (see FIGS. 6A and 6B) in which both a sensor 7 and lead films 10 were positioned at a stepped-back position of 100 nm from an air bearing surface S and were not exposed on the air bearing surface S was manufactured.

In the embodiments 1 through 3 and the comparative examples 1 and 2, the sensors 7 were made of NiFe and had a width of 500 nm in a track direction (a direction orthogonal to FIG. 2), a height of 100 nm in a direction orthogonal to the air bearing surface S, and a thickness of 30 nm in a film surface orthogonal direction P. The lead films 10 were made of AuCu and had a thickness of 60 nm in the film surface orthogonal direction P. A stepped-back distance of the sensors 7 and the lead films 10 from the air bearing surfaces S were determined according to a polishing amount of the air bearing surface S.

In a case that a number of magnetic heads were manufactured for each of the embodiments 1 through 3 and the comparative examples 1 and 2, a variation of electrical resistance values of the sensors 7 after a polishing step of the air bearing surfaces S is shown in Table 1. In each following experiment, a voltage applied to the sensor 7 through the lead films 10 was maintained at 130 mV.

TABLE 1

|  | Stepped-back Distance from air bearing surface S (nm) | | Variation of Electrical Resistance |
| --- | --- | --- | --- |
|  | Sensor | Lead Film | Value (% Stdev) |
| Embodiment 1 | 100 | 0 | 3.27 |
| Embodiment 2 | 150 | 0 | 3.45 |
| Embodiment 3 | 250 | 0 | 3.33 |
| Comparative Example 1 | 0 | 0 | 18.2 |
| Comparative Example 2 | 100 | 100 | 3.62 |

The Table 1 shows that the comparative example 1 in which both the sensor 7 and the lead films 10 were exposed on the air bearing surface S had a very large variation of the electrical resistance values. It is apparent that the reliability is low.

Figure 7:
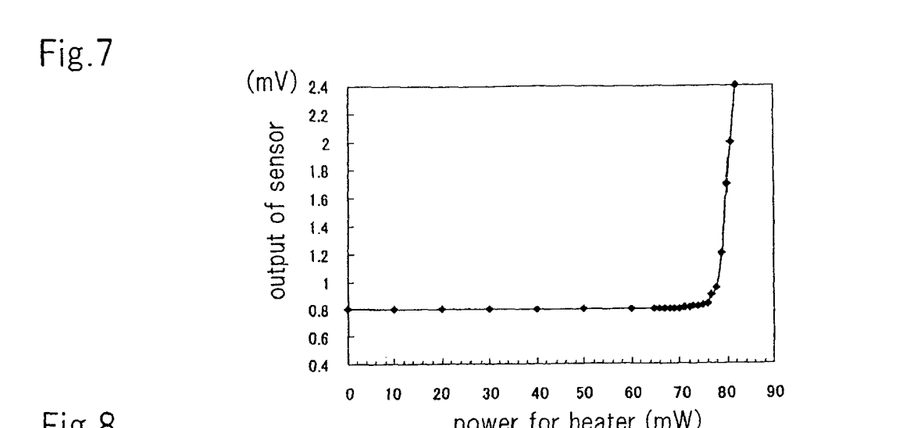
FIG. 7 is a graph illustrating a relation between power supplied to a heater and a detected output of a sensor of the magnetic head of the embodiment 1 of the present invention.

The heaters 8 of the embodiments 1 through 3 and the comparative example 1 and 2 were operated and heated the magnetic heads 3. The heat expansion by the heat application caused a portion of the magnetic heads 3 to jut and contact the magnetic disks 1. Outputs (detected outputs) of the sensors 7 corresponding to the change of the electrical resistance values of the sensors 7 according to the frictional heat generated by the contact were measured. FIG. 7 illustrates the measured results of the detected outputs of the magnetic head 3 of the embodiment 1.

Herein, a point where the detected output of 150% with respect to an output obtained when the heat application started (namely, the electrical power for the heater was 0 mW) was defined as a touch down detection point (TDDP). In the embodiment 1 illustrated in FIG. 7, the detected output at a starting point of the heat application was 0.8 mV. The detected output of 1.2 mV, i.e., 150% of the detected output of 0.8 mV, was obtained when the electrical power for the heater was approximately 80 mW. Accordingly, the TDDP of the embodiment 1 was approximately 80 mW.

Figure 8:
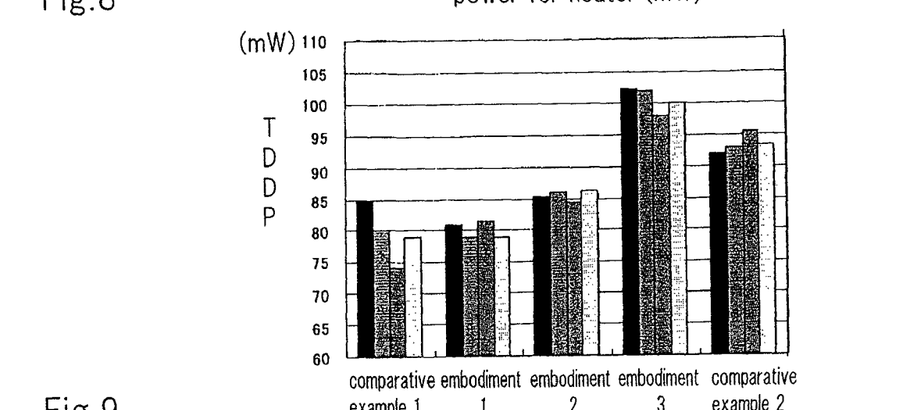
FIG. 8 is a graph illustrating touch clown detection points of the magnetic heads of embodiments 1 through 3 of the present invention and the comparative examples 1 and 2.

Four samples (the magnetic heads 3) for each of the embodiments 1 through 3 and the comparative examples 1 and 2 were manufactured respectively. The electrical power for the heater was varied in the same way illustrated in FIG. 7, and the changes of the detected outputs corresponding to the variation of the electric power for the heater were measured. Then based on the pre-described definition, the TDDPs respectively were obtained. The results are illustrated in FIG. 8. According to FIG. 8, the TDDP of the embodiment 1 was approximately 80 mW as described above, the TDDP of the embodiment 2 was approximately 85 mW, and the TDDP of the embodiment 3 was approximately 100 mW. On the other hand, the TDDP of the comparative example 1 was approximately 80 mW even though there was large variation. In the comparative example 1, the large variation of the detected output of the sensor 7 was caused by the large variation of the electrical resistance value of the sensor 7 as shown in Table 1. The TDDP of the comparative example 2 was approximately 93 mW.

Herein, when it is assumed that a basic character of the magnetic head 3 and a condition for moving the magnetic head 3 downwardly by the operation of the heater 8 are the same, in each of the embodiments 1 through 3 and the comparative examples 1 and 2, it is concluded that the frictional heat starts to be generated by the magnetic head 3 contacting the magnetic disk 1 at almost the same timing. As the temperatures dramatically increase after that timing, the electrical resistance value and the detected output of the sensor 7 drastically increase. However, the increasing rates between the electrical resistance value and the detected output of the sensor 7 are variously different. It is said that, the larger the rates of increase of the electrical resistance value and the detected output of the sensor 7 are, the faster a point (timing) is obtained when the detected output is 150% with respect to the heat application starting point (when electrical power for the heater is 0 mW). This can be referred to as the high sensitivity. In other words, the smaller the TDDP is, the faster the contact between the magnetic head 3 and the magnetic disk 1 is detected so that the high sensitivity and the high detection efficiency are realized.

Compared with the comparative example 2 of which the TDDPs are relatively large, the embodiment 1 of which the TDDPs are small has the high detection efficiency. In embodiment 1, the stepped-back distance from the air bearing surface S of the sensor 7 is the same as the comparative example 2. However, due to heat transfer to the sensor 7 through the lead films 10 having the high heat conductivity, the higher detection efficiency can be obtained compared with the comparative example 2 transferring heat to the sensor 7 through the insulating material, such as alumina, whose heat conductivity is not so high. Moreover, embodiment 1 has a better detection efficiency than embodiment 3 of which the TDDPs are relatively large. In embodiment 1, the sensor 7 is positioned at a nearer position from the air bearing surface S than embodiment 3. Accordingly, the loss of heat transferred through the lead films 10 is small, which means that a high detected efficiency can be obtained. Therefore, when the stepped-back distance of the sensor 7 from the air bearing surface S is excessively large, it causes a decrease in detected efficiency, which is understood as not being preferable. Specifically, the stepped-back distance of the sensor 7 from the air bearing surface S is preferably less than 250 nm and more preferably 200 nm or less.

The comparative example 1 has the good detected efficiency but also has a disadvantage of slow reliability because of the large variation as described above. One reason for the low reliability is because the performance of the sensor 7 easily changes. Specifically, in the comparative example 1, since the sensor 7 is exposed on the air bearing surface S, when even a small error occurs during the manufacturing process, such as during polishing of the air bearing surface 5, the height of the sensor 7 is changed so that the performance of the sensor 7 is also changed. The other reason for the low reliability is because of external factors affecting the performance of the sensor 7. Specifically, in comparative example 1, the sensor 7 is exposed on the air bearing surface S so that the sensor 7 is directly affected by external factors except the heat generated by the heater 8 such as shock, wind, and the like that are applied to the air bearing surface S. On the other hand, in embodiments 1 through 3, since the sensor 7 is not exposed on the air bearing surface S, even though a small error may occur during the manufacturing process, such as polishing of the air bearing surface S, the error does not affect the height of the sensor 7 positioned in the stepped-back position from the air bearing surface S. Moreover, since the sensor 7 is not exposed on the air bearing surface S and is covered by the insulating film 10, external factors, such as shock, wind and the like, that are applied to the air bearing surface S do not directly affect the sensor 7, and only the heat generated by the heater 8 affects the sensor 7. Therefore, the variations of embodiments 1 through 3 are smaller compared with comparative example 1.

Figure 9:
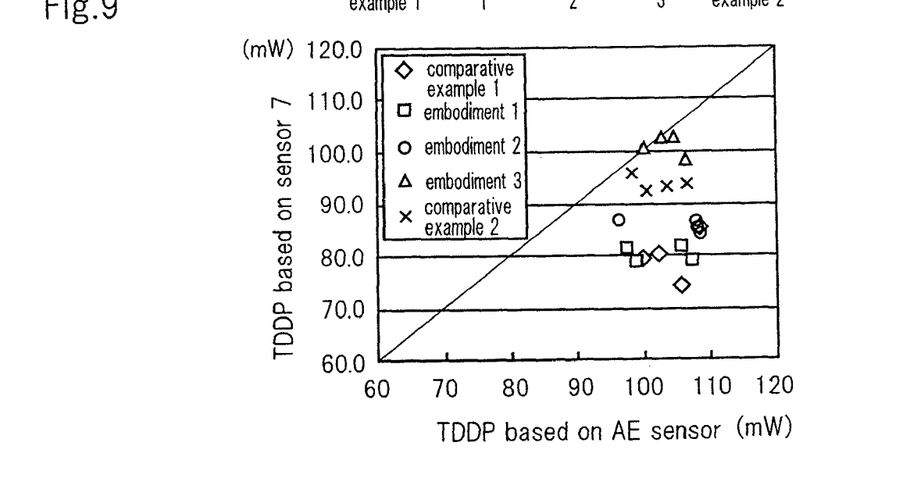
FIG. 9 is a graph illustrating a relation between touch down detection points obtained by using the sensors of the magnetic heads of the embodiments 1 through 3 of the present invention and the comparative examples 1 and 2, and touch down detection points obtained by using an AE sensor.

Herein, an AE (acoustic emission) sensor including a not-illustrated piezoelectric element was arranged in each magnetic head 3 of embodiments 1 through 3 and comparative examples 1 and 2. In the same method as the one illustrated in FIGS. 7 and 8, TDDPs were obtained based on a detected output of the AE sensor instead of the detected output of the sensor 7. FIG. 9 illustrates the relation between the TDDPs obtained based on the detected output of the AE sensor and the TDDPs obtained based on the detected output of the sensor 7 illustrated in FIG. 8. Referring to FIG. 9, in all of embodiments 1 through 3 and comparative examples 1 and 2, the TDDPs obtained based on the detected output of the sensor 7 illustrated in FIG. 8 were smaller than the TDDPs obtained based on the detected output of the AE sensor. In other words, it can be concluded that higher sensitivity, higher detection efficiency and higher reliability were realized when the sensor 7 was used compared with when the AE sensor was used. Particularly, in embodiments 1 and 2, and comparative example 1, considerably favorable results were obtained when the sensor 7 was used compared with when the AE sensor was used. This shows that the higher sensitivity, the higher detected efficiency and the higher reliability are realized where the frictional heat generated by the contact between the magnetic head 3 and the magnetic disk 1 is detected from the change of the electrical resistance value of the sensor 7 in the present invention, compared with where vibration generated by the contact between the magnetic head 3 and the magnetic disk 1 is detected from a voltage change of the AE sensor. Referring to FIG. 9, it can also be understood that the variations of TDDPs of the embodiments 1 through 3 are smaller than one of the comparative examples 1 and 2.

Next, an experiment for checking the durability of the sensor 7 was executed using the embodiment 1 and the comparative example 1. Specifically, a treatment to obtain a resistance variation ratio of the sensor 7 was repeated five times for one magnetic head. The resistance variation ratio was measured during a period where electrical power supplied to the heater was increased from 0 mW to (TDDP+30) mW. In each treatment, since the electrical power supplied to the heater was increased up to (TDDP+30) mW, it is considered that the magnetic head 3 certainly contacted the magnetic disk 1. Additionally, the resistance variation ratio is a percentage of the increase of the electrical resistance value with respect to a value where the electrical resistance value of the sensor 7 before starting the first treatment is set to 0.

Figure 10:
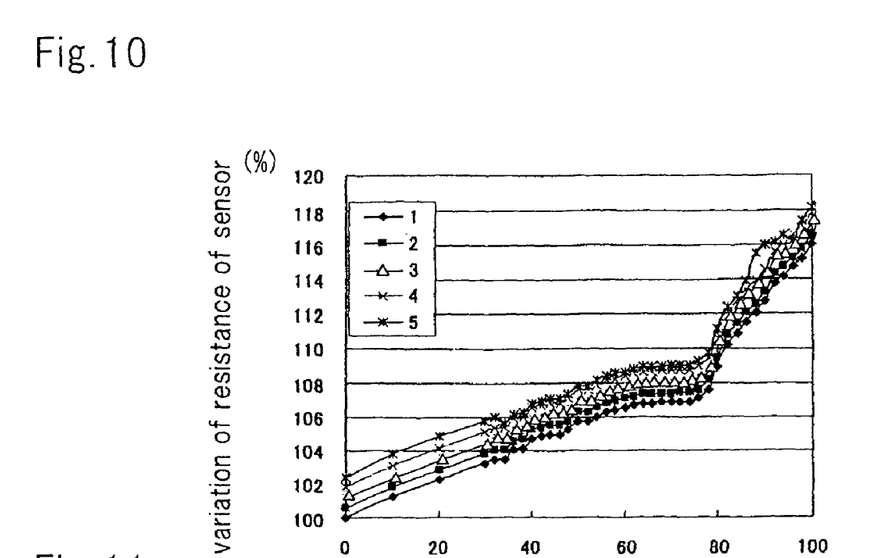
FIG. 10 is a graph illustrating a relation between power supplied to the heater and a resistance variation ratio of the sensor of the magnetic head of the comparative example 1.
Figure 11:
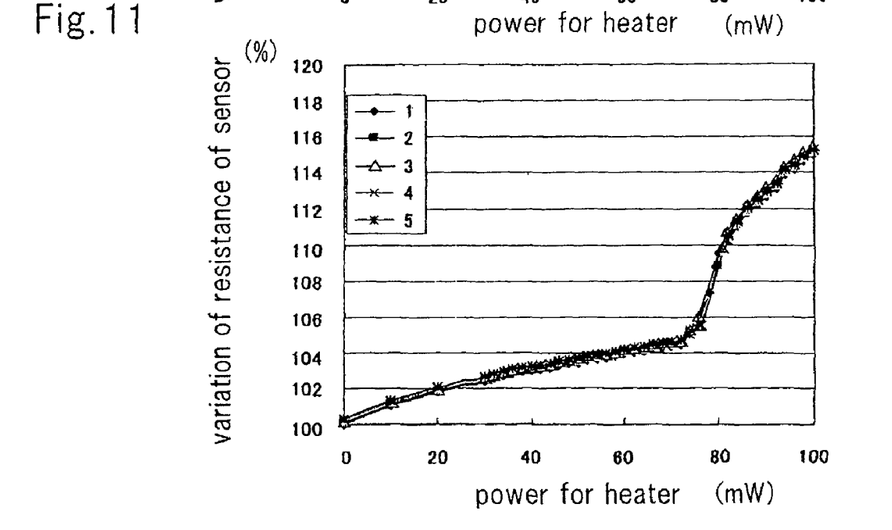
FIG. 11 is a graph illustrating a relation between power supplied to the heater and a resistance variation ratio of the sensor of the magnetic head of the embodiment 1 of the present invention.

Referring to FIG. 10, in the comparative example 1, the electrical resistance value increased as the treatment is repeated. It is considered that the sensor 7 exposed on the air bearing surface S is trimmed when the magnetic head 3 contacts the magnetic disk 1 and the height (the height in the orthogonal direction to the air bearing surface S) of the sensor 7 is decreased, so that the electrical resistance value is increased. On the other hand, as illustrated in FIG. 11, in the embodiment 1, from the first treatment to the fin treatment, the electrical resistances values corresponding to the same electric power for heater are the mostly the same and almost do not change. As described above, according to the embodiment 1, even if the magnetic head 3 repeatedly contacts the magnetic disk 1, the measurement performance of the sensor 7 does not change so that the measurement can be repeated in the same condition, and the reliability is high. This is because, in the embodiment 1, the sensor 7 is not exposed on the air bearing surface S and is positioned in the stepped-back position from the air bearing surface S, and the surface of the sensor 7 is insulated by the insulating film 9 made of, for example, alumina. Accordingly, even if the magnetic head 3 repeatedly contacts to the magnetic disk 1, the height of the sensor 7 does not change and the electrical resistance value is not changed. This is considered as the same in the embodiments 2 and 3. Additionally, in order to reliably protect the sensor 7 by the insulating film 9 considering the processing accuracy of an air bearing surface S with respect to the technological standard when the present specification is applied, the thickness of the insulating film 9, i.e., the stepped-back distance of the sensor 7 from the air bearing surface S is preferably 10 nm or more. The size of the sensor 7 was not limited by the pre-described example. Though it is not described in detail, the experiment by the present applicant proved that, when the width of the track direction (the direction orthogonal to the cross section illustrated in FIG. 2) is 50 nm to 3000 nm, the height in the direction orthogonal to the air bearing surface S is 50 nm to 400 nm, and the thickness of the film surface orthogonal direction P is 5 nm to 50 nm, the sensor 7 functioned as the sensor 7 of the present invention that was able to detect the temperature change of the air bearing surface S by measuring the electrical resistance value.

In the pre-described example, the lead film 10 made of AuCu was used. Though it is not described in detail, when the lead films 10 made of Ru, Rh, Pt, or the like, were used, it was also proved that heat was successfully transferred to the sensor 7 and that the similar effect to the pre-described experiments was obtained.

Next, a manufacturing method of a main part of the magnetic head (mainly the sensor 7 and the lead film 10) will be explained with reference to FIGS. 12A through 22A. FIGS. 12A, 13A, 14A, 15A, 16A, 17A, 18A, 19A, 20A, 21A and 22A are drawings seen from an integration surface side. FIGS. 12B, 14B, 17B and 20B are drawings seen from the air bearing surface S side and illustrate the enlarged main part (center part) of the cross section through line A-A in each of the drawings. FIGS. 12C, 14C, 17C, and 20C are drawings seen from the height direction and illustrate the enlarged main part (center part) of the cross section through line B-B in each of the drawings.

Figure 2:
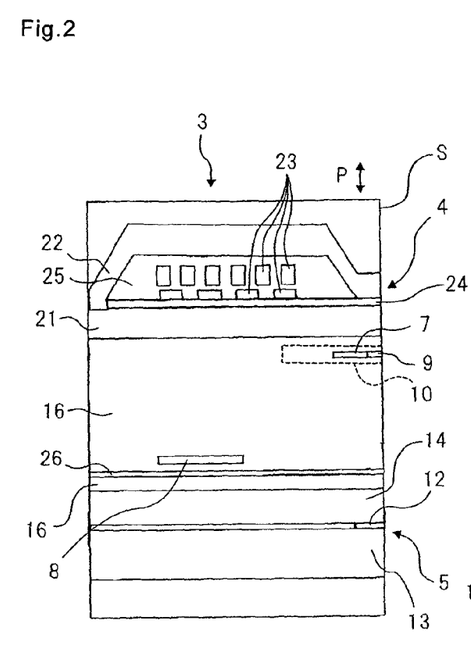
FIG. 2 is a cross-sectional view illustrating a structure of the magnetic head illustrated in FIGS. 1A and 1B.
Figures 12A, 12B:
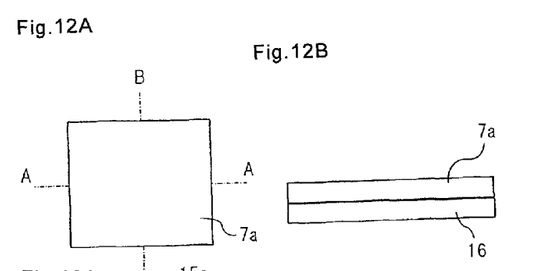
FIG. 12A is a view illustrating a manufacturing method of the main part of the magnetic head of the present invention seen from the integration surface side.
FIG. 12B is a view illustrating the manufacturing method of the main part of the magnetic head of the present invention seen from the air bearing surface side.
Figure 12C:
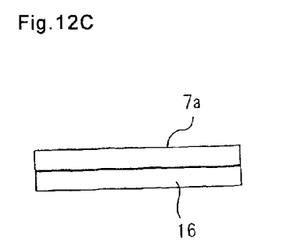
FIG. 12C is a view illustrating the manufacturing method of the main part of the magnetic head of the present invention seen from a height direction.
Figures 13A, 14A, 14B, 15A:
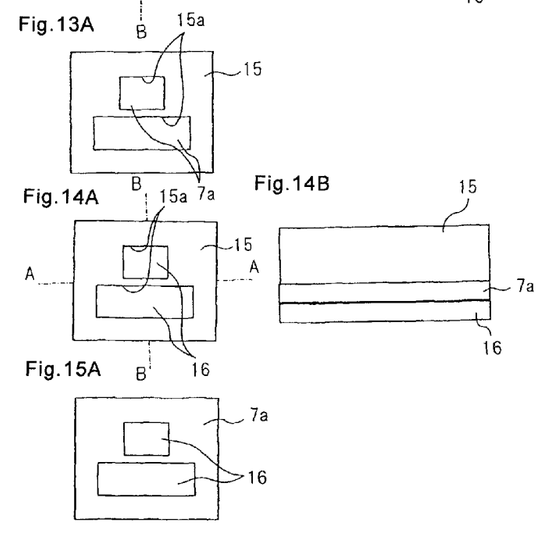
FIG. 13A is a view illustrating a step of the manufacturing method of the main part of the magnetic head of the present invention, the step following FIGS. 12A through 12C, seen from the integration surface side.
FIG. 14A is a view illustrating a step of the manufacturing method of the main part of the magnetic head of the present invention, the step following FIG. 13A, seen from the integration surface side.
FIG. 14B is a view illustrating a step of the manufacturing method of the main part of the magnetic head of the present invention, the step following FIG. 13A, seen from the air bearing surface side.
FIG. 15A is a view illustrating a step of the manufacturing method of the main part of the magnetic head of the present invention, the step following FIGS. 14A through 14C, seen from the integration surface side.
Figure 14C:
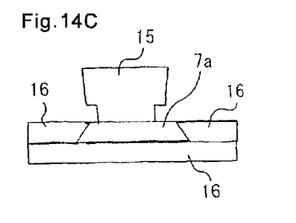
FIG. 14C is a view illustrating a step of the manufacturing method of the main part of the magnetic head of the present invention, the step following FIG. 13A, seen from the height direction.
Figure 16A:
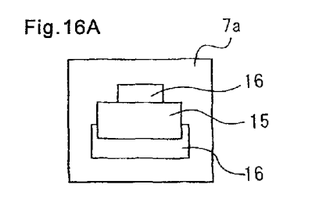
FIG. 16A is a view illustrating a step of the manufacturing method of the main part of the magnetic head of the present invention, the step following FIG. 15A, from the integration surface side.
Figure 17A:
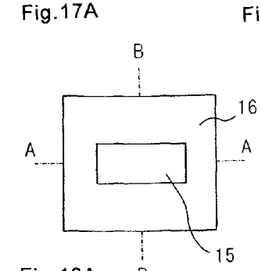
FIG. 17A is a view illustrating a step of the manufacturing method of the main part of the magnetic head of the present invention, the step following FIG. 16A, seen from the integration surface side.
Figure 17B:
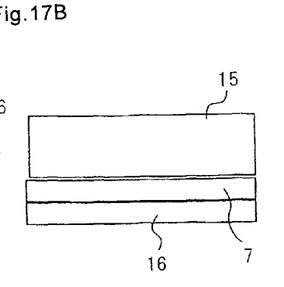
FIG. 17B is a view illustrating a step of the manufacturing method of the main part of the magnetic head of the present invention, the step following FIG. 16A, seen from the air bearing surface side.
Figure 17C:
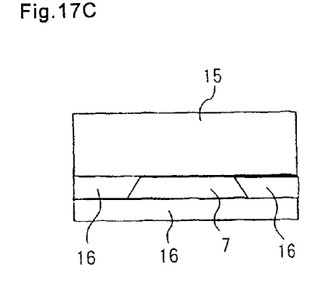
FIG. 17C is a view illustrating a step of the manufacturing method of the main part of the magnetic head of the present invention, the step following FIG. 16A, seen from the height direction.
Figure 18A:
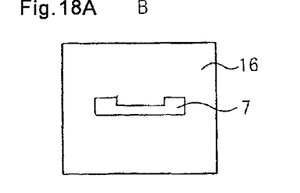
FIG. 18A is a view illustrating a step of the manufacturing method of the main part of the magnetic head of the present invention, the step following FIGS. 17A through 17C, seen from the integration surface side.
Figure 19A:
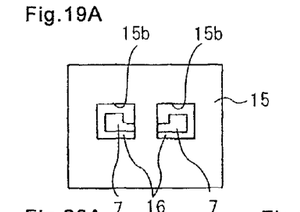
FIG. 19A is a view illustrating a step of the manufacturing method of the main part of the magnetic head of the present invention, the step following FIG. 18A, seen from the integration surface side.
Figure 20A:
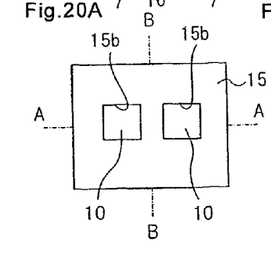
FIG. 20A is a view illustrating the manufacturing method of the main part of the magnetic head of the present invention, the step following FIG. 19A, seen from integration surface side.
Figure 20B:
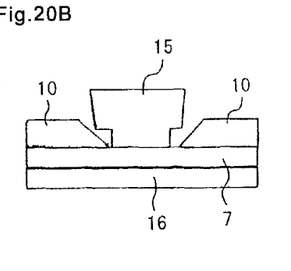
FIG. 20B is a view illustrating a step of the manufacturing method of the main part of the magnetic head of the present invention, the step following FIG. 19A, seen from the air bearing surface side.
Figure 20C:
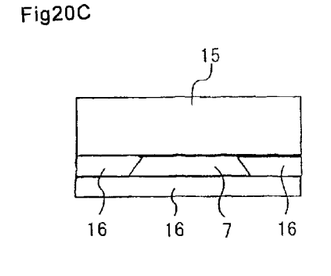
FIG. 20C is a view illustrating a step of the manufacturing method of the main part of the magnetic head of the present invention, the step following FIG. 19A, seen from the height direction.
Figure 21A:
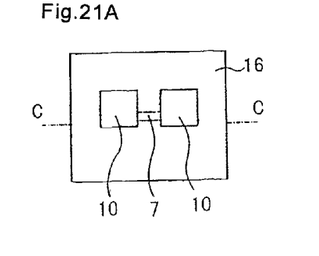
FIG. 21A is a view illustrating a step of the manufacturing method of the main part of the magnetic head of the present invention, the step following FIGS. 20A through 20C, seen from integration surface side.
Figure 22A:
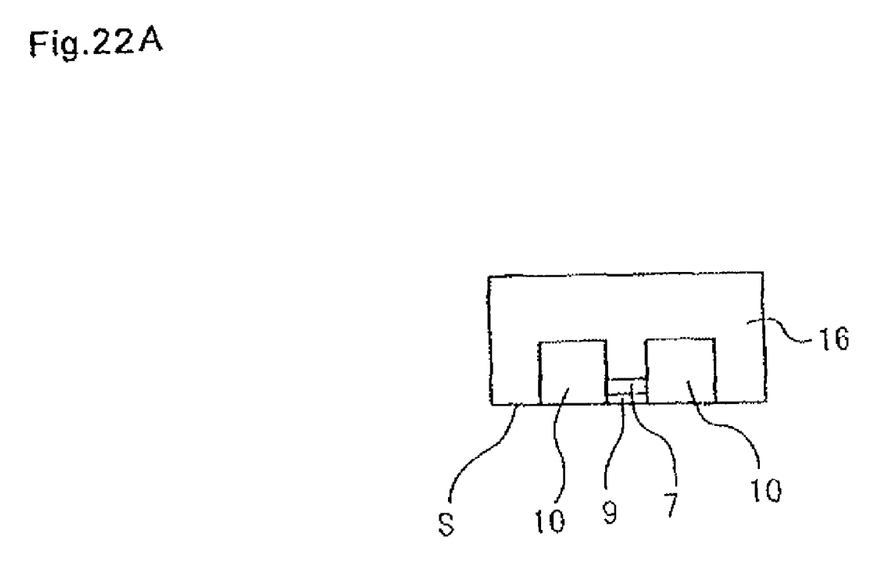
FIG. 22A is a view of the main part of the magnetic head of the present invention manufactured by going through the step illustrated in FIG. 21A and seen from the integration surface side.

As illustrated in FIGS. 12A through 12C, a metal film (for example, NiFe film) 7a to be the sensor 7 is formed on a member to be a base (an insulating film 16 illustrated in FIG. 2). Then, as illustrated in FIG. 13A, a resist pattern 15 having opening parts 15a for patterning the sensor 7 is formed on the metal film 7a. As illustrated in FIGS. 14A, 14B and 14C, the metal film 7a in the opening parts 15a is removed by ion milling, and then the insulating film 16 made of, for example, alumina is formed. As illustrated in FIG. 15A, the resist pattern 15 is removed, and a part of the metal film 7a and the insulating film 16 are exposed. As illustrated in FIG. 16A, the resist pattern 15 for patterning the sensor 7 is formed again. As illustrated in FIGS. 17A through 17C, the metal film 7a in the periphery of the resist pattern 15 is removed by ion milling, and then the insulating film 16 made of, for example, alumina is formed. As illustrated in FIG. 18A, the resist pattern 15 is removed, and the sensor 7 made of the metal film 7a is exposed. As illustrated in FIG. 19A, the resist pattern 15 having opening parts 15b for forming the lead film 10 is formed. As illustrated in FIGS. 20A through 20C, the lead films 10 made of a metal, such as AuCu, are formed in the opening parts 15b. A pair of the lead films 10 contacts the both ends parts of the sensor 7 in the opening parts 15b. As illustrated in FIG. 21A, the resist pattern 15 is removed. Then, when all constituent elements of the magnetic head 2 including the recording element part 4 etc. were made, processes, such as polishing, are executed from the bottom up as viewed in FIG. 21A. For example, the polishing process is stopped when the polishing process under line C-C is finished to obtain a state illustrated in FIG. 22A. This polished surface is the air bearing surface S. Referring to FIG. 22A, the sensor 7 is positioned in the stepped-back position from the air bearing surface S and is covered by the insulating film 16. This part of the insulating film 16 which covers the sensor 7 is described as the insulating film 9 for ease of understanding. The lead films 10 contact both ends parts of the sensor 7 and are exposed on the air bearing surface S.

Figure 23:
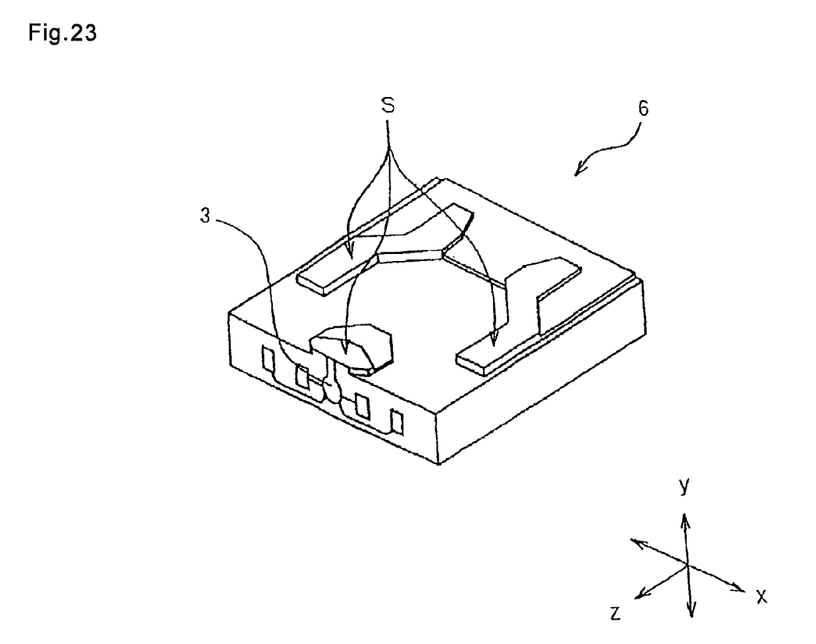
FIG. 23 is a perspective view of the slider including the magnetic head of the present invention.

The slider 6 in which such a magnetic head 3 is formed is illustrated in FIG. 23. The slider 6 has a substantially hexahedral shape, and one surface of the six outer surfaces is the air bearing surface S facing the magnetic disk 1.

Figure 24:
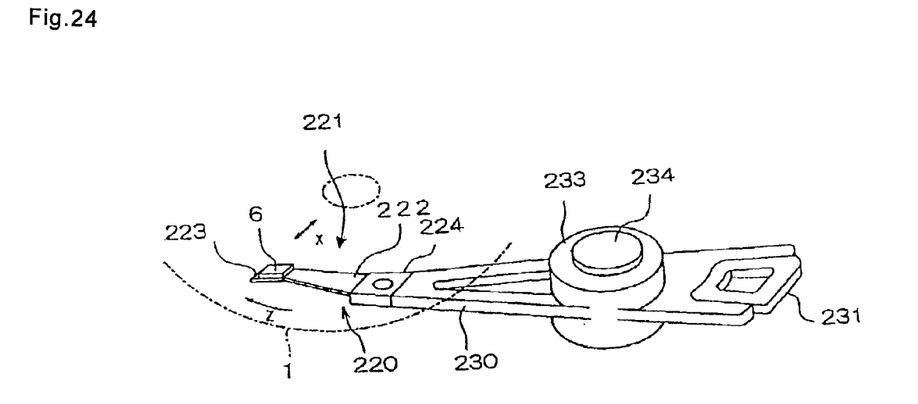
FIG. 24 is a perspective view of a head arm assembly including a head gimbal assembly in which the slider illustrated in FIG. 23 is incorporated.

As shown in FIG. 24, a head gimbal assembly 220 has the slider 6 and a suspension 221 elastically supporting the slider 6. The suspension 221 has a load beam 222, a flexure 223, and a base plate 224. The load beam 222 is formed in a plate (leaf) spring shape and made of stainless steel. The flexure 223 is arranged in one edge part of the load beam 222. The base plate 224 is arranged in the other edge part of the load beam 222. The flexure 223 is joined to the slider 6 to give the slider 6 suitable flexibility. At the part of the flexure 223 to which the slider 6 is attached, a gimbal part is disposed to maintain the slider 6 in an appropriate position and orientation.

The slider 6 is arranged in the hard disk device such that the slider 6 is opposite to the magnetic disk (hard disk) 1. The magnetic disk 1 is a recording medium having a disk shape and is rotatably driven. When the magnetic disk 1 rotates in the z-direction of FIG. 23, air flow passing between the magnetic disk 1 and the slider 6 generates a downward lifting force in the y-direction to the slider 6. The slider 6 flies from the surface of the magnetic disk 1 due to the lifting force. Additionally, as illustrated in FIG. 1B, the flying height can be fine-tuned using the heat expansion of the slider 6 generated by the heat of the heater 8. In the vicinity of the edge part of the slider 6 at the air flow exit side (edge part in the bottom left of FIG. 23), the magnetic head 3 in thin film shape is formed.

A part in which the head gimbal assembly 220 is mounted on an aim 230 is referred to as a head arm assembly 221. The arm 230 moves the slider 6 in the track crossing direction x of the magnetic disk 1. One edge of the arm 230 is mounted on the base plate 224. On the other edge of the arm 230, a coil 231 is mounted, which forms one part of a voice coil motor. A bearing part 233 is arranged in the middle section of the arm 230. The arm 230 is rotatably supported by a shaft 234 mounted on the bearing part 233. The arm 230 and the voice coil motor for driving the arm 230 configure an actuator.

Figure 25:
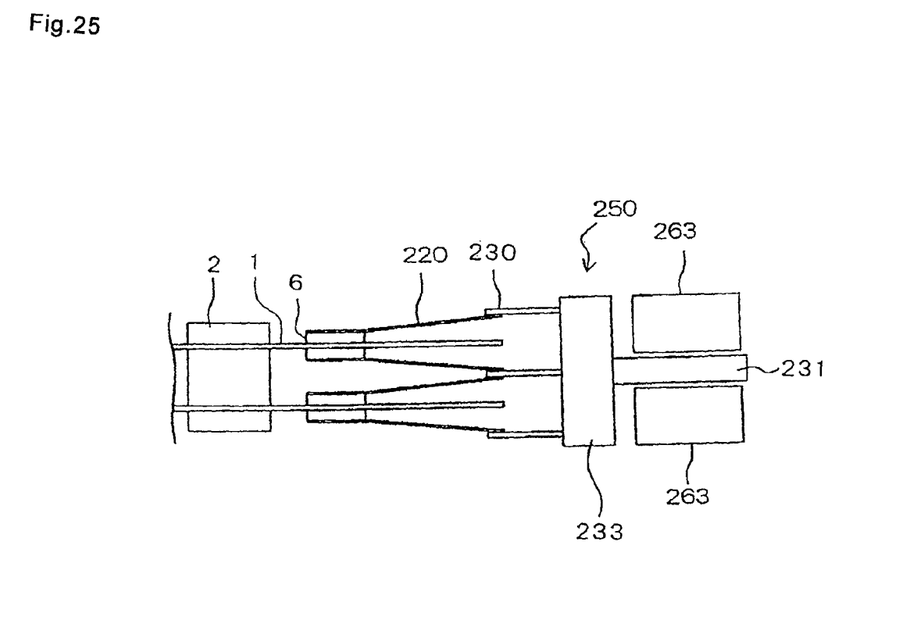
FIG. 25 is a side view of the head arm assembly in which the slider illustrated in FIG. 23 is incorporated.
Figure 26:
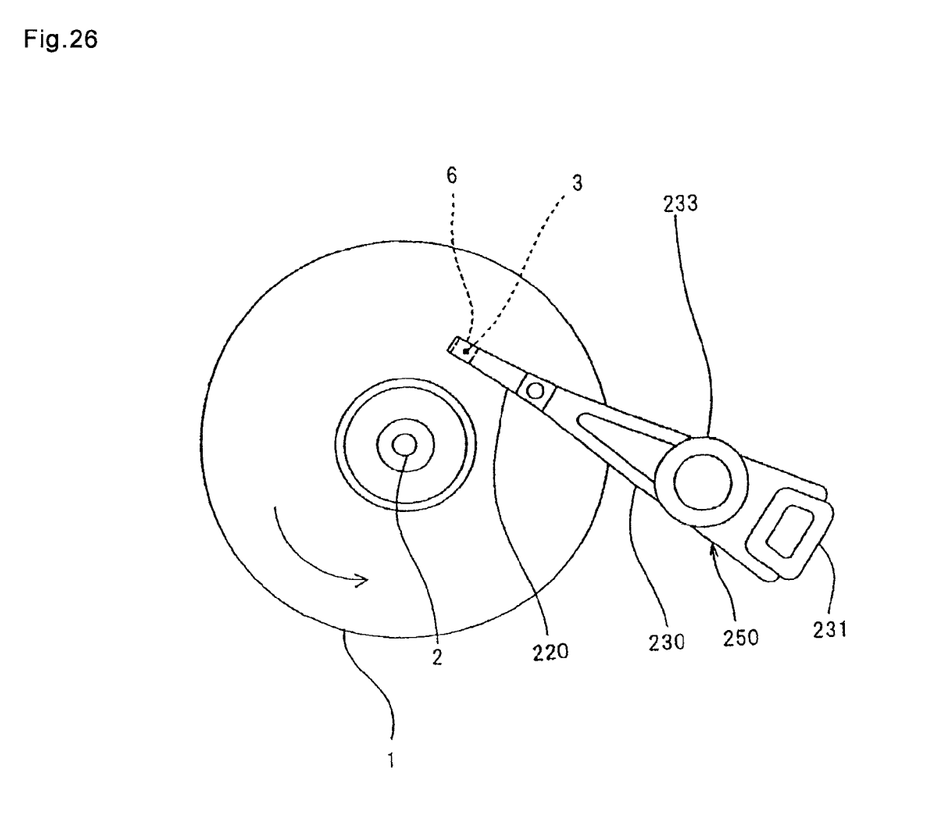
FIG. 26 is a plan view of the hard disk device in which the slider illustrated in FIG. 23 is incorporated.

Next, referring to FIGS. 25 and 26, descriptions of a head stack assembly in which the above-described slider 6 is integrated and the hard disk device will be explained. The head stack assembly includes a carriage having a plurality of arms, wherein a head gimbal assembly 220 is mounted on each arm. FIG. 25 is a side view of the head stack assembly. FIG. 26 is a plan view of the hard disk device. The head stack assembly 250 includes a carriage having a plurality of arms 230. The carriage configures the pre-described bearing part 233. On each arm 230, head gimbal assemblies 220 are mounted so as to align at an interval in the vertical direction. At the carriage in the opposite side of arm 230, the coil 231 is mounted to be a part of the voice coil motor. The voice coil motor has permanent magnets 263 arranged facing each other on both sides of the coil 231.

Referring to FIG. 26, the head stack assembly 250 is integrated in the hard disk device. The hard disk device has multiple magnetic disks 1 mounted on a spindle motor 2 that is the rotatably supporting mechanism. For each magnetic disk 1, two sliders 6 are arranged facing each other as sandwiching the magnetic disk 1. The head stack assembly 250 except the slider 6 and an actuator correspond to a positioning device of the present invention, and not only support the slider 6 but also position the slider 6 with respect to the magnetic disk 1. The slider 6 is moved in the track crossing direction of the magnetic disk 1 by the actuator, and is positioned with respect to the magnetic disk 1. The magnetic head 3 under the thin film shape included in the slider 6 records the magnetic information on the magnetic disk 1 by the recording element part 4 of the recording head 3, and reproduces the information recorded on the magnetic disk 1 by the reproducing element part 5.

While preferred embodiments of the present invention have been described using specific terms, such description is for illustrative purposes only, and it is to be understood that changes and variations may be made without departing from the spirit or scope of the following claims.

What is claimed is:

1. A magnetic head disposed in a slider arranged with an interval with respect to a magnetic disk, comprising:
a thermal asperity effect element sensor that is configured to measure an electrical resistance value of an inside of the sensor for detection of contact between the magnetic head and a surface of the magnetic disk, and that is positioned in a stepped-back position from an air bearing surface facing the magnetic disk;
an insulating film that is positioned on the air bearing surface and that covers the sensor;
a pair of lead films, the lead films being electrically connected to the sensor such that at least portions of the lead films are exposed on the air bearing surface, and being configured to transfer a temperature change of the air bearing surface to the sensor; and
a reproducing element part for reproducing information recorded on the magnetic disk, wherein
the reproducing element part is provided separately from the sensor.

2. The magnetic head according to claim 1, further comprising:
a heater that is provided in the slider and that decreases a flying height of the magnetic head from the magnetic disk due to a heat expansion of the slider.

3. The magnetic head according to claim 1, wherein
an electrical resistance value of the sensor varies corresponding to a temperature change of the air bearing surface as transferred through the lead films, and
the pair of the lead films respectively connect both edge parts of the sensor and apply a voltage to the sensor.

4. The magnetic head according to claim 1, wherein
the stepped-back distance of the sensor from the air bearing surface is 10 nm or more.

5. The magnetic head according to claim 4, wherein
the stepped-back distance of the sensor from the air bearing surface is 200 nm or less.

6. The magnetic head according to claim 1, wherein
the pair of lead films include at least a material having a heat conductivity ratio of 70 W/(m·k) or more.

* * * * *